US011474593B2

(12) United States Patent
Erivantcev et al.

(10) Patent No.: US 11,474,593 B2
(45) Date of Patent: Oct. 18, 2022

(54) TRACKING USER MOVEMENTS TO CONTROL A SKELETON MODEL IN A COMPUTER SYSTEM

(71) Applicant: FINCHXR LTD., Limassol (CY)

(72) Inventors: Viktor Vladimirovich Erivantcev, Ufa (RU); Alexander Sergeevich Lobanov, Ufa (RU); Alexey Ivanovich Kartashov, Moscow (RU); Daniil Olegovich Goncharov, Ufa (RU)

(73) Assignee: Finch Technologies Ltd., Tortola (VG)

( * ) Notice: Subject to any disclaimer, the term of this patent is extended or adjusted under 35 U.S.C. 154(b) by 0 days.

(21) Appl. No.: 15/973,137

(22) Filed: May 7, 2018

(65) Prior Publication Data
US 2019/0339766 A1    Nov. 7, 2019

(51) Int. Cl.
*G06F 3/01*   (2006.01)
*G06N 3/04*   (2006.01)
(Continued)

(52) U.S. Cl.
CPC .............. *G06F 3/011* (2013.01); *G06F 3/017* (2013.01); *G06F 3/0346* (2013.01);
(Continued)

(58) Field of Classification Search
CPC ........ G06F 3/017; G06F 3/0304; G06F 3/011; G06F 3/014; G06F 1/163; G06K 9/00355;
(Continued)

(56) References Cited

U.S. PATENT DOCUMENTS 5,515,477 A * 5/1996 Sutherland ........... G06K 9/6232
706/41
7,565,295 B1   7/2009 Hernandez-rebollar
(Continued)

FOREIGN PATENT DOCUMENTS

| CN | 103226398 | 7/2013 |
| WO | 2016183812 | 11/2016 |
| WO | 2016209819 | 12/2016 |

OTHER PUBLICATIONS

Accessories for Vive, retrieved from https://www.vive.com/us/accessory/ on Jan. 30, 2017.
(Continued)

*Primary Examiner* — Dong Hui Liang
(74) *Attorney, Agent, or Firm* — Greenberg Traurig

(57) ABSTRACT

A system having sensor modules and a computing device. Each sensor module has an inertial measurement unit attached to a portion of a user to generate motion data identifying a sequence of orientations of the portion. The computing device provides the sequences of orientations measured by the sensor modules as input to an artificial neural network, obtains as output from the artificial neural network a predicted orientation measurement of a part of the user, and controls an application by setting an orientation of a rigid part of a skeleton model of the user according to the predicted orientation measurement. The artificial neural network can be trained to predict orientations measured using an optical tracking system based on orientations measured using inertial measurement units and/or to prediction orientation measurements of some rigid parts in a kinematic chain based on orientation measurements of other rigid parts in the kinematic chain.

20 Claims, 5 Drawing Sheets

(51) Int. Cl.
    *G06N 3/067* (2006.01)
    *G06K 9/00* (2022.01)
    *G06F 3/0346* (2013.01)
    *G06V 40/20* (2022.01)

(52) U.S. Cl.
    CPC ........... *G06N 3/0445* (2013.01); *G06N 3/067* (2013.01); *G06V 40/20* (2022.01)

(58) Field of Classification Search
    CPC ........... G06K 9/00335; G06K 9/00369; G06K 9/00389; G06K 9/66; G06K 9/00375; G06K 9/00342; G06N 20/00; G06N 3/02; G06N 3/08; G06N 5/02; G06N 7/005; G06N 7/02; G06N 7/023
    See application file for complete search history.

(56) References Cited

U.S. PATENT DOCUMENTS

| | | |
|---|---|---|
| 8,187,100 B1 | 5/2012 | Kahn et al. |
| 8,933,886 B2 | 1/2015 | Imoto et al. |
| 8,988,438 B2* | 3/2015 | Bang .................. G06K 9/00342 345/420 |
| 9,141,194 B1 | 9/2015 | Keyes et al. |
| 9,278,453 B2 | 3/2016 | Assad |
| 9,405,372 B2 | 8/2016 | Yen et al. |
| D772,986 S | 11/2016 | Chen et al. |
| 9,504,414 B2 | 11/2016 | Coza et al. |
| 9,600,925 B2 | 3/2017 | Katz et al. |
| 9,827,496 B1 | 11/2017 | Zinno |
| 9,891,718 B2 | 2/2018 | Connor |
| 9,996,945 B1 | 6/2018 | Holzer et al. |
| 10,019,806 B2 | 7/2018 | Perry et al. |
| 10,379,613 B2 | 8/2019 | Erivantcev et al. |
| 10,416,755 B1 | 9/2019 | Erivantcev et al. |
| 10,509,464 B2 | 12/2019 | Erivantcev et al. |
| 10,509,469 B2 | 12/2019 | Erivantcev et al. |
| 10,521,011 B2 | 12/2019 | Erivantcev et al. |
| 10,534,431 B2 | 1/2020 | Erivantcev et al. |
| 10,540,006 B2 | 1/2020 | Erivantcev et al. |
| 10,635,166 B2 | 4/2020 | Erivantcev et al. |
| 10,705,113 B2 | 7/2020 | Erivantcev et al. |
| 10,838,495 B2 | 11/2020 | Erivantcev et al. |
| 10,860,091 B2 | 12/2020 | Erivantcev et al. |
| 10,976,863 B1 | 4/2021 | Erivantcev et al. |
| 11,009,941 B2 | 5/2021 | Erivantcev et al. |
| 11,016,116 B2 | 5/2021 | Erivantcev et al. |
| 2003/0142065 A1 | 7/2003 | Pahlavan |
| 2003/0193572 A1 | 10/2003 | Wilson et al. |
| 2007/0050597 A1 | 3/2007 | Ikeda |
| 2007/0263001 A1 | 11/2007 | Trzecieski |
| 2007/0273610 A1 | 11/2007 | Baillot |
| 2008/0088468 A1 | 4/2008 | Kim |
| 2008/0262772 A1 | 10/2008 | Luinge et al. |
| 2009/0322763 A1 | 12/2009 | Bang et al. |
| 2010/0079466 A1 | 4/2010 | Griffin |
| 2010/0194879 A1* | 8/2010 | Pasveer .............. A63B 24/0006 348/135 |
| 2010/0307241 A1* | 12/2010 | Raman .................. G01C 19/56 73/504.12 |
| 2011/0025853 A1 | 2/2011 | Richardson |
| 2011/0161804 A1 | 6/2011 | Park et al. |
| 2011/0228251 A1* | 9/2011 | Yee .......................... G01S 17/36 356/5.01 |
| 2012/0025945 A1 | 2/2012 | Yazadi et al. |
| 2012/0130203 A1 | 5/2012 | Stergiou et al. |
| 2012/0214591 A1 | 8/2012 | Ito et al. |
| 2012/0293410 A1 | 11/2012 | Bell |
| 2013/0317648 A1 | 11/2013 | Assad |
| 2014/0028547 A1 | 1/2014 | Bromley et al. |
| 2014/0201689 A1 | 7/2014 | Bedikian et al. |
| 2014/0313022 A1 | 10/2014 | Moeller et al. |
| 2015/0062086 A1 | 3/2015 | Nattukallingal |
| 2015/0077347 A1 | 3/2015 | OGreen |
| 2015/0145860 A1 | 5/2015 | Craig et al. |
| 2015/0145985 A1 | 5/2015 | Gourlay et al. |
| 2015/0154453 A1 | 6/2015 | Wilf |
| 2015/0177842 A1 | 6/2015 | Rudenko |
| 2015/0213653 A1 | 7/2015 | Kord |
| 2015/0277559 A1 | 10/2015 | Vescovi et al. |
| 2015/0358543 A1 | 12/2015 | Kord |
| 2016/0005232 A1 | 1/2016 | Quarles |
| 2016/0054797 A1 | 2/2016 | Tokubo et al. |
| 2016/0077608 A1 | 3/2016 | Nakasu et al. |
| 2016/0085310 A1 | 3/2016 | Shotton et al. |
| 2016/0187969 A1 | 6/2016 | Larsen et al. |
| 2016/0306431 A1 | 10/2016 | Stafford et al. |
| 2016/0313798 A1 | 10/2016 | Connor |
| 2016/0335486 A1 | 11/2016 | Fleishman et al. |
| 2016/0338644 A1 | 11/2016 | Connor |
| 2016/0378204 A1 | 12/2016 | Chen et al. |
| 2017/0028551 A1* | 2/2017 | Hemken ................ B25J 11/009 |
| 2017/0053454 A1 | 2/2017 | Katz et al. |
| 2017/0083084 A1 | 3/2017 | Tatsuta et al. |
| 2017/0115728 A1 | 4/2017 | Park et al. |
| 2017/0147066 A1 | 5/2017 | Katz et al. |
| 2017/0168586 A1 | 6/2017 | Sinha et al. |
| 2017/0186226 A1 | 6/2017 | Cashman et al. |
| 2017/0308165 A1 | 10/2017 | Erivantcev et al. |
| 2017/0344829 A1 | 11/2017 | Lan et al. |
| 2017/0347885 A1 | 12/2017 | Tan et al. |
| 2017/0352188 A1 | 12/2017 | Levitt |
| 2017/0371403 A1 | 12/2017 | Wetzler et al. |
| 2018/0008196 A1 | 1/2018 | Connor |
| 2018/0020978 A1* | 1/2018 | Kaifosh ............... A61B 5/7275 702/150 |
| 2018/0095637 A1 | 4/2018 | Valdivia et al. |
| 2018/0101989 A1 | 4/2018 | Frueh et al. |
| 2018/0106618 A1 | 4/2018 | Cerchio et al. |
| 2018/0122098 A1 | 5/2018 | Wang et al. |
| 2018/0165879 A1 | 6/2018 | Holzer et al. |
| 2018/0217680 A1 | 8/2018 | Sudou et al. |
| 2018/0225517 A1 | 8/2018 | Holzer et al. |
| 2018/0253142 A1 | 9/2018 | Tsuchie et al. |
| 2018/0293756 A1 | 10/2018 | Liu et al. |
| 2018/0313867 A1 | 11/2018 | Erivantcev et al. |
| 2018/0330521 A1 | 11/2018 | Samples et al. |
| 2018/0335834 A1 | 11/2018 | Erivantcev et al. |
| 2018/0335843 A1 | 11/2018 | Erivantcev et al. |
| 2018/0335855 A1 | 11/2018 | Erivantcev et al. |
| 2018/0350105 A1 | 12/2018 | Taylor et al. |
| 2019/0187784 A1 | 6/2019 | Erivantcev et al. |
| 2019/0212359 A1 | 7/2019 | Erivantcev et al. |
| 2019/0212807 A1 | 7/2019 | Erivantcev et al. |
| 2019/0332171 A1 | 10/2019 | Erivantcev et al. |
| 2019/0369715 A1 | 12/2019 | Erivantcev et al. |
| 2020/0033937 A1 | 1/2020 | Erivantcev et al. |
| 2020/0073483 A1 | 3/2020 | Berenzweig et al. |
| 2020/0081534 A1 | 3/2020 | Erivantcev et al. |
| 2020/0225738 A1 | 7/2020 | Erivantcev et al. |
| 2021/0089116 A1 | 3/2021 | Erivantcev et al. |
| 2021/0089162 A1 | 3/2021 | Erivantcev et al. |
| 2021/0208180 A1 | 7/2021 | Erivantcev et al. |

OTHER PUBLICATIONS

Daydream, retrieved from https://vr.google.com/daydream/ on Jan. 30, 2017.
Forward kinematics, Wikipedia, retrieved from https://en.wikipedia.org/wiki/Forward_kinematics on Sep. 21, 2017.
Gest—Work with your hands. Wayback Machine 2016. Retrieved from https://web.archive.org/web/20160304012247/https://gest.co/ on Jan. 30, 2017.
Gloveone: Feel Virtual Reality. Wayback Machine 2016. Retrieved from https://web.archive.org/web/20160307080001/https://www.gloveonevr.com/ on Jan. 30, 2017.
International Application No. PCT/US2017/028982, International Search Report and Written Opinion, dated Aug. 24, 2017.
Manus VR—The Pinnacle of Virtual Reality Controllers, Manus VR Development Kit Pro Q4 2016.

(56) References Cited

OTHER PUBLICATIONS

Manus VR—The virtual reality dataglove for consumers. Wayback Machine 2016. Retrieved from https://web.archive.org/web/20160417035626/https://manusvr. com/ on Jan. 30, 2017.
NeuroDigital: The VR Technology Factory, retrieved from https://www.neurodigital.es/ on Jan. 30, 2017.
Oculus Rift | Oculus. Retrieved from https://www3.oculus.com/enus/ rift/ on Jan. 30, 2017.
RevolVR Virtual Reality Controllers, retrieved from http://revolvr.co/ on Jan. 30, 2017.
Wireless Gaming Controllers for PC, Mac, and Mobile | SteelSeries, retrieved from https://steelseries.com/gamingcontrollers on Jan. 30, 2017.
Xbox Wireless Controller, retrieved from http://www.xbox.com/en-US/xbox-one/accessories/controllers/xbox-wireless-controller on Jan. 30, 2017.
Ben Lang, "Google Demonstrates Promising Low-cost, Mobile Inside-out Controller Tracking", https://www.roadtovr.com/google-mobile-6dof-vr-controller-tracking-inside-out/, Apr. 28, 2018.
Ben Lang, "Oculus Claims Breakthrough in Hand-tracking Accuracy", https://www.roadtovr.com/oculus-claims-breakthrough-in-hand-tracking-accuracy/, May 3, 2018.
Camera Calibration and 3D Reconstruction, OpenCV 2.4.13.6 documentation, https://docs.opencv.org/2.4/modules/calib3d/doc/camera_calibration_and_3d_reconstruction.html, printed on Jun. 11, 2018.
Forward kinematics, Wikipedia, printed on Sep. 21, 2017.
Kinematic chain, Wikipedia, printed on Apr. 23, 2018.
Reinforcement learning, Wikipedia, printed on Apr. 25, 2018.
Stereo camera, Wikipedia, printed on Jun. 29, 2018.
Supervised learning, Wikipedia, printed on Apr. 25, 2018.
Devices for Controlling Computers Based on Motions and Positions of Hands, U.S. Appl. No. 15/492,915, filed Apr. 20, 2017, Viktor Erivantcev, et al, Publications—Issue Fee Payment Verified, Nov. 13, 2019.
Devices for Controlling Computers Based on Motions and Positions of Hands, U.S. Appl. No. 16/683,648, Viktor Erivantcev, et al, Application Undergoing Preexam Processing, Nov. 14, 2019.
Calibration of Inertial Measurement Units Attached to Arms of a User to Generate Inputs for Computer Systems, U.S. Appl. No. 15/817,646, filed Nov. 20, 2017, Viktor Erivantcev, et al, Docketed New Case—Ready for Examination, Jan. 10, 2018.
Tracking Finger Movements to Generate Inputs for Computer Systems, U.S. Appl. No. 15/792,255, filed Oct. 24, 2017, Viktor Erivantcev, et al, Docketed New Case—Ready for Examination, Jan. 9, 2018.
Tracking Arm Movements to Generate Inputs for Computer Systems, U.S. Appl. No. 16/508,249, filed Jul. 10, 2019, Viktor Erivantcev, et al, Non Final Action dated Jul. 31, 2019.
Tracking Torso Orientation to Generate Inputs for Computer Systems, U.S. Appl. No. 16/813,813, filed Nov. 15, 2017, Viktor Erivantcev, et al, Docketed New Case—Ready for Examination, Jan. 17, 2018.
Calibration of Inertial Measurement Units Attached to Arms of a User and to a Head Mounted Device, U.S. Appl. No. 15/847,669, filed Dec. 19, 2017, Viktor Erivantcev, et al, Non Final Action dated Apr. 8, 2019.
Correction of Accumulated Errors in Inertial Measurement Units Attached to a User, U.S. Appl. No. 15/868,745, filed Jan. 11, 2018, Viktor Erivantcev, et al, Docketed New Case—Ready for Examination—Mar. 2, 2018.
Tracking Torso Leaning to Generate Inputs for Computer Systems, U.S. Appl. No. 15/864,860, filed Jan. 8, 2018, Viktor Erivantcev, et al, Docketed New Case—Ready for Examination, Feb. 12, 2018.
Motion Predictions of Overlapping Kinematic Chains of a Skeleton Model Used to Control a Computer System, U.S. Appl. No. 15/996,389, filed Jun. 1, 2018, Viktor Erivantcev, et al, Allowed—Notice of Allowance Not Yet Mailed, dated Apr. 10, 2019.
Motion Predictions of Overlapping Kinematic Chains of a Skeleton Model Used to Control a Computer System, U.S. Appl. No. 16/532,880, filed Aug. 6, 2019, Viktor Erivantcev, et al, Non Final Action dated Aug. 20, 2019.
Calibration of Measurement Units in Alignment with a Skeleton Model to Control Computer Systems, U.S. Appl. No. 16/044,984, filed Jul. 25, 2018, Viktor Erivantcev, et al, Docketed New Case—Ready for Examination, Aug. 27, 2018.
Calibration of Inertial Measurement Units in Aligment with a Skeleton Model to Control a Computer System Based on Determination of Orientation of an Inertial Measurement Unit from an Image of a Portion of a User, U.S. Appl. No. 16/576,661, filed Sep. 19, 2019, Viktor Erivantcev, et al, Docketed New Case—Ready for Examination, Oct. 21, 2019.
Devices for Controlling Computers Based on Motions and Positions of Hands, U.S. Appl. No. 15/492,915, filed Apr. 20, 2017, Viktor Erivantcev et al., Patented Case, Nov. 26, 2019.
Devices for Controlling Computers Based on Motions and Positions of Hands, U.S. Appl. No. 16/683,648, filed Nov. 14, 2019, Viktor Erivantcev et al., Docketed New Case—Ready for Examination, Dec. 3, 2019.
Calibration of Inertial Measurement Units Attached to Arms of a User to Generate Inputs for Computer Systems, U.S. Appl. No. 15/817,646, filed Nov. 20, 2017, Viktor Erivantcev et al., Notice of Allowance Mailed—Application Received in Office of Publications, dated Feb. 28, 2020.
Tracking Arm Movements to Generate Inputs for Computer Systems, U.S. Appl. No. 15/787,555, filed Oct. 18, 2017, Viktor Erivantcev et al., Patented Case, Jul. 24, 2019.
Tracking Finger Movements to Generate Inputs for Computer Systems, U.S. Appl. No. 15/792,255, filed Oct. 24, 2017, Viktor Erivantcev et al., Patented Case, Dec. 24, 2019.
Tracking Arm Movements to Generate Inputs for Computer Systems, U.S. Appl. No. 16/508,249, filed Jul. 10, 2019, Viktor Erivantcev et al., Response to Non-Final Office Action Entered and Forwarded to Examiner, Nov. 4, 2019.
Tracking Torso Orientation to Generating Inputs for Computer Systems, U.S. Appl. No. 15/813,813, filed Nov. 15, 2017, Viktor Erivantcev et al., Patented Case, Jan. 1, 2020.
Calibration of Inertial Measurement Units Attached to Arms of a User and to a Head Mounted Device, U.S. Appl. No. 15/847,669, filed Dec. 19, 2017, Viktor Erivantcev et al., Patented Case, Dec. 11, 2019.
Correction of Accumulated Errors in Inertial Measurement Units Attached to a User, U.S. Appl. No. 15/868,745, filed Jan. 11, 2018, Viktor Erivantcev et al., Non Final Action Counted, Not Yet dated Mar. 29, 2020.
Motion Predictions of Overlapping Kinematic Chains of a Skeleton Model used to Control a Compter System, U.S. Appl. No. 15/996,389, filed Jun. 1, 2018, Viktor Erivantcev et al., Patented Case, Aug. 28, 2019.
Motion Predictions of Overlapping Kinematic Chains of a Skeleton Model used to Control a Computer System, U.S. Appl. No. 16/532,880, filed Aug. 6, 2019, Viktor Erivantcev et al., Patented Case, Apr. 8, 2020.
Motion Predictions of Overlapping Kinematic Chains of a Skeleton Model Used to Control a Computer System, U.S. Appl. No. 16/827,573, filed Mar. 23, 2020, Viktor Erivantcev et al., Non-Final Action Counted, Not Yet dated Apr. 21, 2020.
Calibration of Measurement Units in Alignment Units in Alignment with a Skeleton Model to Control a Computer a Computer System, U.S. Appl. No. 16/044,984, filed Jul. 25, 2018, Viktor Erivantcev et al., Response to Non-Final Office Action Entered and Forwarded to Examiner, dated May 6, 2020.
Calibration of Inertial Measurement Units in Alignment with a Skeleton Model to Control a Computer System based on Determination of Orientation of an Inertial Measurement Unit from an Image of a Portion of a User, U.S. Appl. No. 16/576,661, filed Sep. 19, 2019, Viktor Erivantcev et al., Docketed New Case—Ready for Examination, Oct. 21, 2019.
Orientation Determination based on Both Images and Inertial Measurement Units, U.S. Appl. No. 16/576,672, filed Sep. 19, 2019, Viktor Erivantcev et al., Docketed New Case—Ready for Examination, Oct. 28, 2019.
International Search Report and Written Opinion, PCT/US2020/047222, dated Nov. 5, 2020.

(56) References Cited

OTHER PUBLICATIONS

Devices for Controlling Computers Based on Motions and Positions of Hands, U.S. Appl. No. 15/492,915, filed Apr. 20, 2017, Viktor Erivantcev et al., Patented Case, May 6, 2019.
Devices for Controlling Computers Based on Motions and Positions of Hands, U.S. Appl. No. 16/683,648, filed Nov. 14, 2019, Viktor Erivantcev et al., Patented Case, Oct. 28, 2020.
Calibration of Inertial Measurement Units Attached to Arms of a User to Generate Inputs for Computer Systems, U.S. Appl. No. 15/817,646, filed Nov. 20, 2017, Viktor Erivantcev et al., Patented Case, Jun. 17, 2020.
Tracking Arm Movements to Generate Inputs for Computer Systems, U.S. Appl. No. 15/787,555, filed Oct. 18, 2017, Viktor Erivantcev et al., Patented Case, Nov. 14, 2018.
Tracking Finger Movements to Generate Inputs for Computer Systems, U.S. Appl. No. 15/792,255, filed Oct. 24, 2017, Viktor Erivantcev et al., Patented Case, Mar. 22, 2019.
Tracking Arm Movements to Generate Inputs for Computer Systems, U.S. Appl. No. 16/508,249, filed Jul. 10, 2019, Viktor Erivantcev et al., Notice of Allowance Mailed—Application Received in Office of Publications, dated Nov. 9, 2020.
Tracking Torso Orientation to Generate Inputs for Computer Systems, U.S. Appl. No. 15/813,813, filed Nov. 15, 2017, Viktor Erivantcev et al., Patented Case, May 9, 2019.
Calibration of Inertial Measurement Units Attached to Arms of a User and to a Head Mounted Device, U.S. Appl. No. 15/847,669, filed Dec. 19, 2017, Viktor Erivantcev et al., Patented Case, Apr. 10, 2019.
Correction of Accumulated Errors in Inertial Measurement Units Attached to a User, U.S. Appl. No. 15/868,745, filed Jan. 11, 2018, Viktor Erivantcev et al., Publications—Issue Fee Payment Verified, Jul. 14, 2020.
Correction of Accumulated Errors in Inertial Measurement Units Attached to a User, U.S. Appl. No. 17/208,628, filed Mar. 22, 2021, Viktor Erivantcev et al., Application Dispatched from Preexam, Not Yet Docketed, Mar. 30, 2021.
Tracking Torso Leaning to Generate Inputs for Computer Systems, U.S. Appl. No. 15/864,860, filed Jan. 8, 2018, Viktor Erivantcev et al., Patented Case, Nov. 26, 2019.
Motion Predictions of Overlapping Kinematic Chains of a Skeleton Model used to Control a Computer System, U.S. Appl. No. 15/996,389, filed Jun. 1, 2018, Viktor Erivantcev et al., Patented Case, Aug. 28, 2019.
Motion Predictions of Overlapping Kinemetic Chains of a Skeleton Model used to Control a Computer System, U.S. Appl. No. 16/532,880, filed Aug. 6, 2019, Viktor Erivantcev et al., Patented Case, Aug. 22, 2019.
Motion Predictions of Overlapping Kinematic Chains of a Skeleton Model Used to Control a Computer Systems, U.S. Appl. No. 16/827,573, filed Mar. 23, 2020, Viktor Erivantcev et al., Patented Case, Apr. 24, 2020.
Calibration of Measurement Units in Alignment with a Skeleton Model to Control a Computer System, U.S. Appl. No. 16/044,984, filed Jul. 25, 2018, Viktor Erivantcev et al., Publications—Issue Fee Payment Verified, May 28, 2020.
Calibration of Inertial Measurement Units in Alignment with a Skeleton Model to Control a Computer System based on Determination of Orientation of an Inertial Measurement Unit from an Image of a Portion of a User, U.S. Appl. No. 16/576,661, filed Sep. 19, 2019, Viktor Erivantcev et al., Publications—Issue Fee Payment Verified, Aug. 27, 2020.
Orientation Determination based on Both Images and Inertial Measurement Units, U.S. Appl. No. 16/576,672, filed Sep. 19, 2019, Viktor Erivantcev et al., Final Rejection dated Apr. 19, 2021.

\* cited by examiner

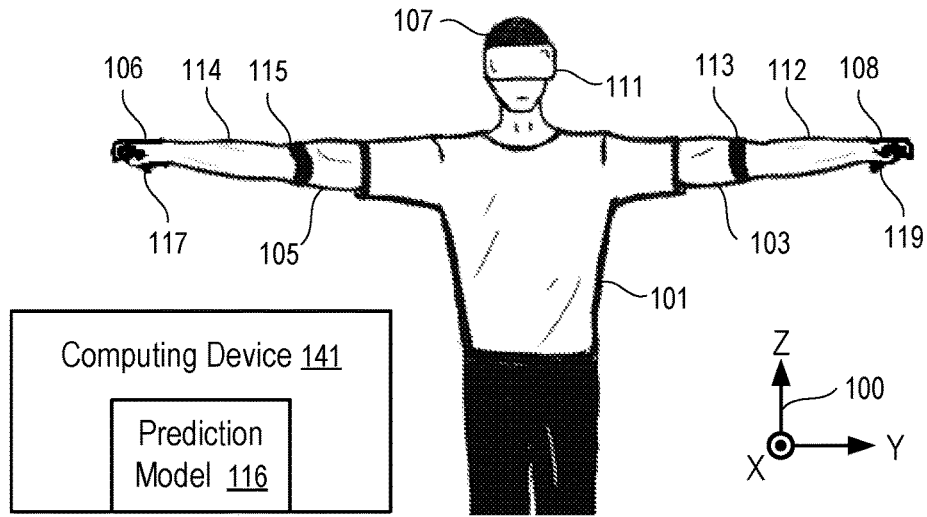
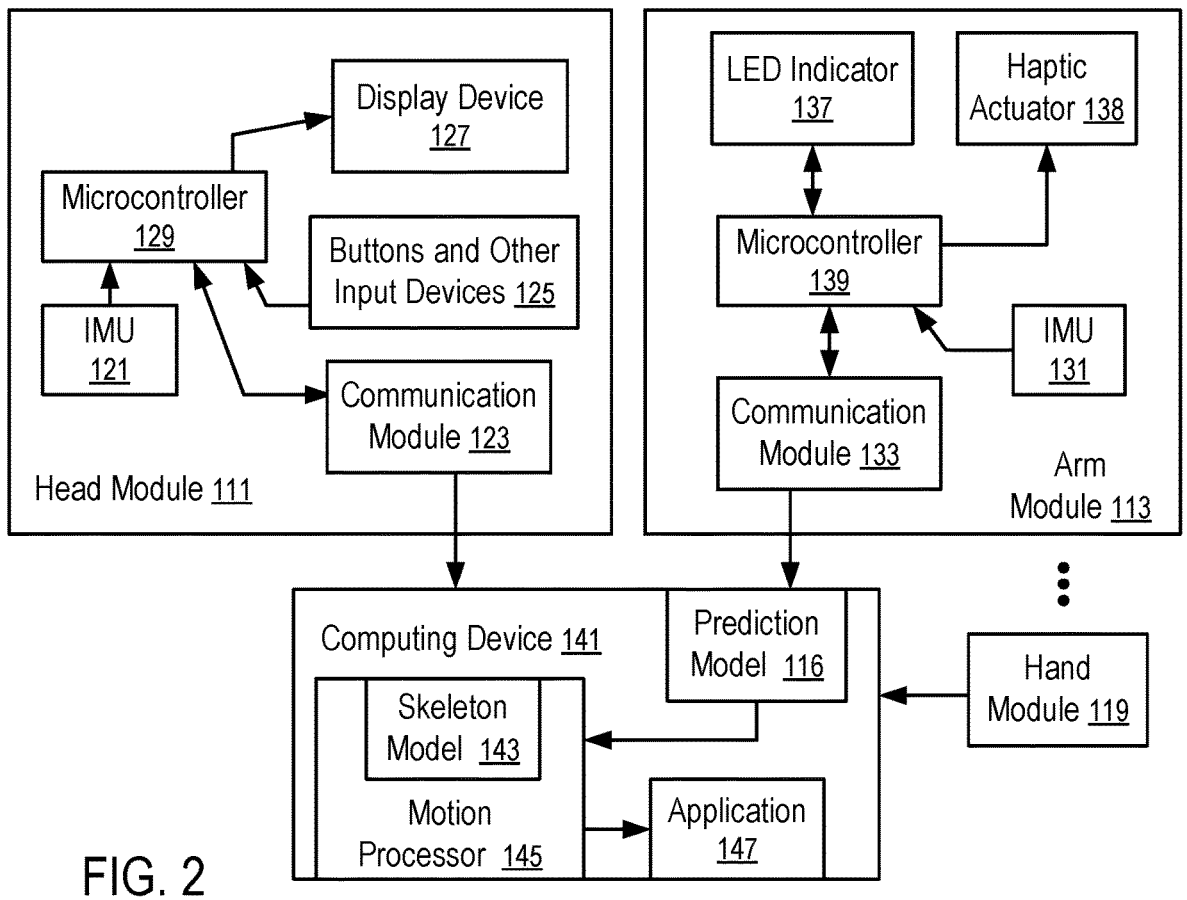
FIG. 1
FIG. 2

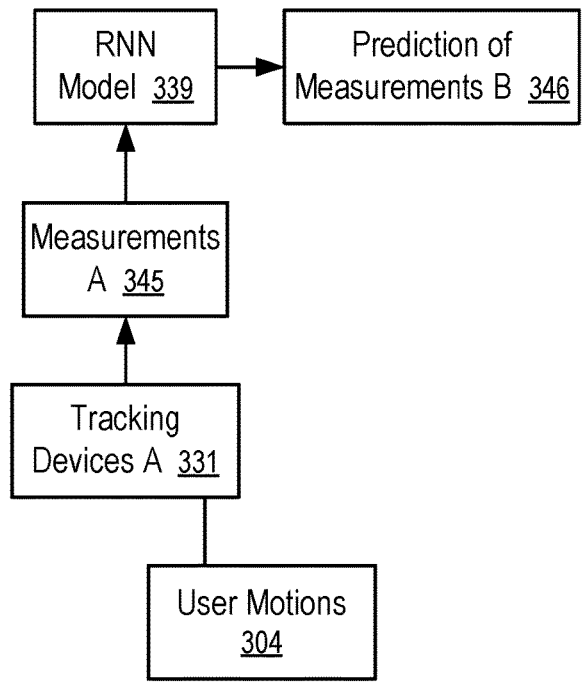

FIG. 7

Attach tracking devices to at least one kinematic chain of a person, including first tracking devices that are separated by one or more second tracking devices on one or more kinematic chains 401

Perform a plurality of sequences of actions involving the least one kinematic chain, starting from a calibration pose 403

Record orientations of the first and second tracking devices in the sequences, where orientations of the first tracking devices are tracked using both a first system and a second system and orientations of the one or moresecond tracking devices are tracked using the second system 405

Train an artificial neural network to predict the orientations of the first and second tracking devices measured by the second system based on the orientations of the first tracking devices measured by the first system 407

TRACKING USER MOVEMENTS TO CONTROL A SKELETON MODEL IN A COMPUTER SYSTEM

RELATED APPLICATIONS

The present application relates to U.S. patent application Ser. No. 15/868,745, filed Jan. 11, 2018 and entitled "Correction of Accumulated Errors in Inertial Measurement Units Attached to a User," U.S. patent application Ser. No. 15/864,860, filed Jan. 8, 2018 and entitled "Tracking Torso Leaning to Generate Inputs for Computer Systems," U.S. patent application Ser. No. 15/847,669, filed Dec. 19, 2017 and entitled "Calibration of Inertial Measurement Units Attached to Arms of a User and to a Head Mounted Device," U.S. patent application Ser. No. 15/817,646, filed Nov. 20, 2017 and entitled "Calibration of Inertial Measurement Units Attached to Arms of a User to Generate Inputs for Computer Systems," U.S. patent application Ser. No. 15/813,813, filed Nov. 15, 2017 and entitled "Tracking Torso Orientation to Generate Inputs for Computer Systems," U.S. patent application Ser. No. 15/792,255, filed Oct. 24, 2017 and entitled "Tracking Finger Movements to Generate Inputs for Computer Systems," U.S. patent application Ser. No. 15/787,555, filed Oct. 18, 2017 and entitled "Tracking Arm Movements to Generate Inputs for Computer Systems," and U.S. patent application Ser. No. 15/492,915, filed Apr. 20, 2017 and entitled "Devices for Controlling Computers based on Motions and Positions of Hands." The entire disclosures of the above-referenced related applications are hereby incorporated herein by reference.

FIELD OF THE TECHNOLOGY

At least a portion of the present disclosure relates to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

U.S. Pat. App. Pub. No. 2016/0085310 discloses techniques to track hand or body pose from image data in which a best candidate pose from a pool of candidate poses is selected as the current tracked pose.

U.S. Pat. App. Pub. No. 2017/0344829 discloses an action detection scheme using a recurrent neural network (RNN) where joint locations are applied to the recurrent neural network (RNN) to determine an action label representing the action of an entity depicted in a frame of a video.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 1 illustrates a system to track user movements according to one embodiment.

FIG. 2 illustrates a system to control computer operations according to one embodiment.

FIGS. 6 and 7 show methods to train a recurrent neural network (RNN) and use the RNN to predict movement measurements of omitted tracking devices based on remaining tracking devices according to one embodiment.

FIGS. 8 and 9 show a method to track user movements using an artificial neural network (ANN) according to one embodiment.

DETAILED DESCRIPTION

Figure 3:
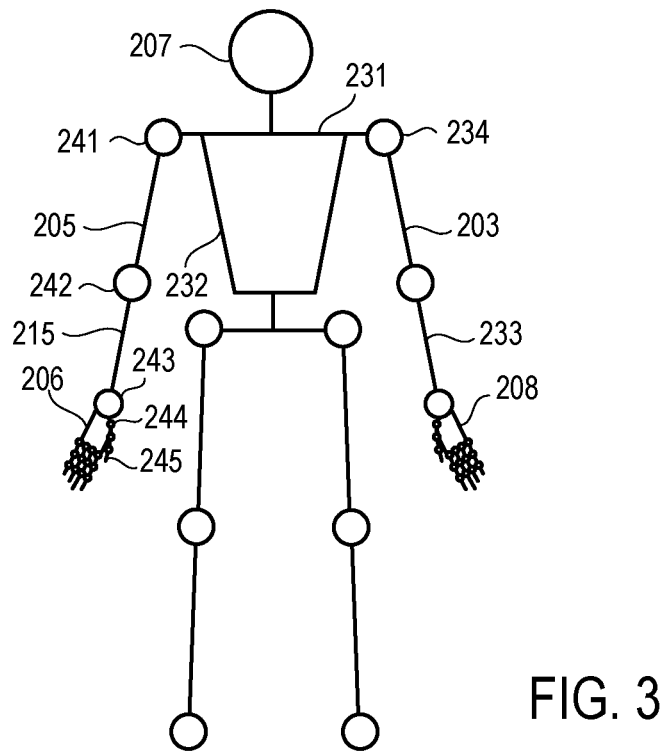
FIG. 3 illustrates a skeleton model that can be controlled by tracking user movements according to one embodiment.

The following description and drawings are illustrative and are not to be construed as limiting. Numerous specific details are described to provide a thorough understanding. However, in certain instances, well known or conventional details are not described to avoid obscuring the description. References to one or an embodiment in the present disclosure are not necessarily references to the same embodiment; and, such references mean at least one.

At least some embodiments disclosed herein allow the tracking of a reduced number of portions of a user using micro-electromechanical system (MEMS) inertial measurement units (IMUs) and using an artificial neural network to control a skeleton model in a computer system having more than the reduced number of portions connected via joints, where each portion may be considered as rigid and movable relative other portions through rotation at the joints.

A kinematic chain is an assembly of rigid parts connected by joints. A skeleton model of a user, or a portion of the user, can be constructed as a set of rigid parts connected by joints in a way corresponding to the bones of the user, or groups of bones, that can be considered as rigid parts.

For example, the head, the torso, the left and right upper arms, the left and right forearms, the palms, phalange bones of fingers, metacarpal bones of thumbs, upper legs, lower legs, and feet can be considered as rigid parts that are connected via various joints, such as the neck, shoulders, elbows, wrist, and finger joints.

A skeleton model of a user can be constructed based on rigid models of body parts of the user parts and the corresponding joints; and the relative positions and/or orientations of the rigid parts collectively represent the pose of the user and/or the skeleton model. The skeleton model of the user can be used to control the presentation of an avatar of the user, to identify the gesture inputs of the user, and/or to make a virtual realty or augmented reality presentation of the user.

FIG. 1 illustrates a system to track user movements according to one embodiment.

FIG. 1 illustrates various parts of a user, such as the torso (101) of the user, the head (107) of the user, the upper arms (103 and 105) of the user, the forearms (112 and 114) of the user, and the hands (106 and 108) of the user.

In an application illustrated in FIG. 1, the hands (106 and 108) of the user are considered rigid parts movable around the wrists of the user. In other applications, the palms and finger bones of the user can be further tracked for their movements relative to finger joints (e.g., to determine the hand gestures of the user made using relative positions among fingers of a hand and the palm of the hand).

In FIG. 1, the user wears several sensor devices (111, 113, 115, 117 and 119) that track the orientations of parts of the user that are considered, or recognized as, rigid in an application.

In an application illustrated in FIG. 1, rigid parts of the user are movable relative to the torso (101) of the user and relative to each other. Examples of the rigid parts include the head (107), the upper arms (103 and 105), the forearms (112 and 114), and the hands (106 and 108). The joints, such as neck, shoulder, elbow, and/or wrist, connect the rigid parts of the user to form one or more kinematic chains. The kinematic chains can be modeled in a computing device (141) to control the application.

To track the relative positions/orientations of rigid parts in a kinematic chain, a tracking device can be attached to each individual rigid part in the kinematic chain to measure its orientation.

In general, the position and/or orientation of a rigid part in a reference system (100) can be tracked using one of many systems known in the field. Some of the systems may use one or more cameras to take images of a rigid part marked using optical markers and analyze the images to compute the position and/or orientation of the part. Some of the systems may track the rigid part based on signals transmitted from, or received at, a tracking device attached to the rigid part, such as radio frequency signals, infrared signals, ultrasound signals. The signals may correspond to signals received in the tracking device, and/or signals emitted from the tracking device. Some of the systems may use inertial measurement units (IMUs) to track the position and/or orientation of the tracking device.

In FIG. 1, the sensor devices (111, 113, 115, 117 and 119) are used to track some of the rigid parts (e.g., 107, 103, 105, 106, 108) in the one or more kinematic chains, but sensor devices are omitted from other rigid parts (101, 112, 114) in the one or more kinematic chains to reduce the number of sensor devices used and/or to improve user experience for wearing the reduced number of sensor devices.

The computing device (141) has a prediction model (141) trained to generate predicted measurements of parts (101, 112, 114, 107, 103, 105, 106, and/or 108) of the user based on the measurements of the sensor devices (111, 113, 115, 117 and 119).

For example, the prediction model (141) can be implemented using an artificial neural network in the computing device (141) to predict the measurements of the orientations of the rigid parts (101, 112, 114) that have omitted sensor devices, based on the measurements of the orientations rigid parts (107, 103, 105, 106, 108) that have the attached sensor devices (111, 113, 115, 117 and 119).

Further, the artificial neural network can be trained to predict the measurements of the orientations of the rigid parts (107, 103, 105, 106, 108) that would be measured by another system (e.g., an optical tracking system), based on the measurement of the attached sensor devices (111, 113, 115, 117 and 119) that measure orientations using a different technique (e.g., IMUs).

The sensor devices (111, 113, 115, 117, 119) communicate their movement measurements to the computing device (141), which computes or predicts the orientation of the rigid parts (107, 103, 105, 106, 108, 101, 112, 114) by applying the measurements obtained from the attached sensor devices (111, 113, 115, 117 and 119) as inputs to an artificial neural network trained in a way as further discussed below.

In some implementations, each of the sensor devices (111, 113, 115, 117 and 119) communicates its measurements directly to the computing device (141) in a way independent from the operations of other sensor devices.

Alternative, one of the sensor devices (111, 113, 115, 117 and 119) may function as a base unit that receives measurements from one or more other sensor devices and transmit the bundled and/or combined measurements to the computing device (141). In some instances, the artificial neural network is implemented in the base unit and used to generate the predicted measurements that are communicated to the computing device (141).

Preferably, wireless connections made via a personal area wireless network (e.g., Bluetooth connections), or a local area wireless network (e.g., Wi-Fi connections) are used to facilitate the communication from the sensor devices (111, 113, 115, 117 and 119) to the computing device (141).

Alternatively, wired connections can be used to facilitate the communication among some of the sensor devices (111, 113, 115, 117 and 119) and/or with the computing device (141).

For example, a hand module (117 or 119) attached to or held in a corresponding hand (106 or 108) of the user may receive the motion measurements of a corresponding arm module (115 or 113) and transmit the motion measurements of the corresponding hand (106 or 108) and the corresponding upper arm (105 or 103) to the computing device (141).

The hand (106), the forearm (114), and the upper arm (105) can be considered a kinematic chain, for which an artificial neural network can be trained to predict the orientation measurements generated by an optical track system, based on the sensor inputs from the sensor devices (117 and 115) that are attached to the hand (106) and the upper arm (105), without a corresponding device on the forearm (114).

Optionally or in combination, the hand module (e.g., 117) may combine its measurements with the measurements of the corresponding arm module (115) to compute the orientation of the forearm connected between the hand (106) and the upper arm (105), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

For example, the hand modules (117 and 119) and the arm modules (115 and 113) can be each respectively implemented via a base unit (or a game controller) and an arm/shoulder module discussed in U.S. patent application Pub. Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111). The head module (111) may further determine the orientation of the torso (101) from the orientation of the arm modules (115 and 113) and/or the orientation of the head module (111), using an artificial neural network trained for a corresponding kinematic chain, which includes the upper arms (103 and 105), the torso (101), and/or the head (107).

For the determination of the orientation of the torso (101), the hand modules (117 and 119) are optional in the system illustrated in FIG. 1.

Further, in some instances the head module (111) is not used in the tracking of the orientation of the torso (101) of the user.

Typically, the measurements of the sensor devices (111, 113, 115, 117 and 119) are calibrated for alignment with a common reference system, such as a coordinate system (100).

After the calibration, the hands, arms (105, 103), the head (107) and the torso (101) of the user may move relative to each other and relative to the coordinate system (100). The measurements of the sensor devices (111, 113, 115, 117 and 119) provide orientations of the hands (106 and 108), the upper arms (105, 103), and the head (107) of the user relative to the coordinate system (100). The computing device (141) computes, estimates, or predicts the current orientation of the torso (101) and/or the forearms (112 and 114) from the current orientations of the upper arms (105, 103), the current orientation the head (107) of the user, and/or the current orientation of the hands (106 and 108) of the user and their orientation history using the prediction model (116).

Optionally or in combination, the computing device (141) may further compute the orientations of the forearms from the orientations of the hands (106 and 108) and upper arms (105 and 103), e.g., using a technique disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

At least some embodiments disclosed herein allow the determination or estimation of the orientation of the torso (101) and/or the forearms (112 and 114) from the orientations of the upper arms (105 and 103), the orientation of the head (107), and/or the orientation of the hands (106 and 108) without the need for additional sensor modules being attached to the torso (101) and the forearms (112 and 114).

FIG. 2 illustrates a system to control computer operations according to one embodiment. For example, the system of FIG. 2 can be implemented via attaching the arm modules (115 and 113) to the upper arms (105 and 103) respectively, the head module (111) to the head (107) and/or hand modules (117 and 119), in a way illustrated in FIG. 1.

In FIG. 2, the head module (111) and the arm module (113) have micro-electromechanical system (MEMS) inertial measurement units (IMUs) (121 and 131) that measure motion parameters and determine orientations of the head (107) and the upper arm (103).

Similarly, the hand modules (117 and 119) can also have IMUs. In some applications, the hand modules (117 and 119) measure the orientation of the hands (106 and 108) and the movements of fingers are not separately tracked. In other applications, the hand modules (117 and 119) have separate IMUs for the measurement of the orientations of the palms of the hands (106 and 108), as well as the orientations of at least some phalange bones of at least some fingers on the hands (106 and 108). Examples of hand modules can be found in U.S. patent application Ser. No. 15/792,255, filed Oct. 24, 2017 and entitled "Tracking Finger Movements to Generate Inputs for Computer Systems," the entire disclosure of which is hereby incorporated herein by reference.

Each of the IMUs (131 and 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) has a prediction model (116) and a motion processor (145). The measurements of the IMUs (e.g., 131, 121) from the head module (111), arm modules (e.g., 113 and 115), and/or hand modules (e.g., 117 and 119) are used in the prediction module (116) to generate predicted measurements of at least some of the parts that do not have attached sensor modules, such as the torso (101), and forearms (112 and 114). The predicted measurements and/or the measurements of the IMUs (e.g., 131, 121) are used in the motion processor (145).

The motion processor (145) has a skeleton model (143) of the user (e.g., illustrated FIG. 3). The motion processor (145) controls the movements of the parts of the skeleton model (143) according to the movements/orientations of the corresponding parts of the user. For example, the orientations of the hands (106 and 108), the forearms (112 and 114), the upper arms (103 and 105), the torso (101), the head (107), as measured by the IMUs of the hand modules (117 and 119), the arm modules (113 and 115), the head module (111) sensor modules and/or predicted by the prediction model (116) based on the IMU measurements are used to set the orientations of the corresponding parts of the skeleton model (143).

Since the torso (101) does not have a separately attached sensor module, the movements/orientation of the torso (101) is predicted using the prediction model (116) using the sensor measurements from sensor modules on a kinematic chain that includes the torso (101). For example, the prediction model (116) can be trained with the motion pattern of a kinematic chain that includes the head (107), the torso (101), and the upper arms (103 and 105) and can be used to predict the orientation of the torso (101) based on the motion history of the head (107), the torso (101), and the upper arms (103 and 105) and the current orientations of the head (107), and the upper arms (103 and 105).

Similarly, since a forearm (112 or 114) does not have a separately attached sensor module, the movements/orientation of the forearm (112 or 114) is predicted using the prediction model (116) using the sensor measurements from sensor modules on a kinematic chain that includes the forearm (112 or 114). For example, the prediction model (116) can be trained with the motion pattern of a kinematic chain that includes the hand (106), the forearm (114), and the upper arm (105) and can be used to predict the orientation of the forearm (114) based on the motion history of the hand (106), the forearm (114), the upper arm (105) and the current orientations of the hand (106), and the upper arm (105).

The skeleton model (143) is controlled by the motion processor (145) to generate inputs for an application (147) running in the computing device (141). For example, the skeleton model (143) can be used to control the movement of an avatar/model of the arms (112, 114, 105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera, etc.

In some implementations, the head module (111) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (117 and 119), the entire disclosures of which applications are hereby incorporated herein by reference.

When a hand module (e.g., 117 or 119) tracks the orientations of the palm and a selected set of phalange bones, the motion pattern of a kinematic chain of the hand captured in the predictive mode (116) can be used in the prediction model (116) to predict the orientations of other phalange bones that do not wear sensor devices.

FIG. 2 shows a hand module (119) and an arm module (113) as examples. In general, an application for the tracking of the orientation of the torso (101) typically uses two arm modules (113 and 115) as illustrated in FIG. 1. The head module (111) can be used optionally to further improve the tracking of the orientation of the torso (101). Hand modules (117 and 119) can be further used to provide additional inputs and/or for the prediction/calculation of the orientations of the forearms (112 and 114) of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operations of the respective microcontroller (129 or 139) to perform primary processing of the sensor data from the IMU (121, 131) and control the operations of the communication module (123, 133), and/or other components, such as the LED indicator (137), the haptic actuator (138), buttons and other input devices (125), the display device (127), etc.

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

FIG. 3 illustrates a skeleton model that can be controlled by tracking user movements according to one embodiment. For example, the skeleton model of FIG. 3 can be used in the motion processor (145) of FIG. 2.

The skeleton model illustrated in FIG. 3 includes a torso (232) and left and right upper arms (203 and 205) that can move relative to the torso (232) via the shoulder joints (234 and 241). The skeleton model may further include the forearms (215 and 233), hands (206 and 208), neck, head (207), legs and feet. In some instances, a hand (206) includes a palm connected to phalange bones (e.g., 245) of fingers, and metacarpal bones of thumbs via joints (e.g., 244).

The positions/orientations of the rigid parts of the skeleton model illustrated in FIG. 3 are controlled by the measured orientations of the corresponding parts of the user illustrated in FIG. 1. For example, the orientation of the head (207) of the skeleton model is configured according to the orientation of the head (107) of the user as measured using the head module (111); the orientation of the upper arm (205) of the skeleton model is configured according to the orientation of the upper arm (105) of the user as measured using the arm module (115); and the orientation of the hand (206) of the skeleton model is configured according to the orientation of the hand (106) of the user as measured using the hand module (117); etc.

The prediction model (116) can have multiple artificial neural networks trained for different motion patterns of different kinematic chains.

For example, a clavicle kinematic chain can include the upper arms (203 and 205), the torso (232) represented by the clavicle (231), and optionally the head (207), connected by shoulder joints (241 and 234) and the neck. The clavicle kinematic chain can be used to predict the orientation of the torso (232) based on the motion history of the clavicle kinematic chain and the current orientations of the upper arms (203 and 205), and the head (207).

For example, a forearm kinematic chain can include the upper arm (205), the forearm (215), and the hand (206) connected by the elbow joint (242) and the wrist joint (243). The forearm kinematic chain can be used to predict the orientation of the forearm (215) based on the motion history of the forearm kinematic chain and the current orientations of the upper arm (205), and the hand (206).

For example, a hand kinematic chain can include the palm of the hand (206), phalange bones (245) of fingers on the hand (206), and metacarpal bones of the thumb on the hand (206) connected by joints in the hand (206). The hand kinematic chain can be used to predict the orientation of the phalange bones and metacarpal bones based on the motion history of the hand kinematic chain and the current orientations of the palm, and a subset of the phalange bones and metacarpal bones tracked using IMUs in a hand module (e.g., 117 or 119).

For example, a torso kinematic chain may include clavicle kinematic chain and further include forearms and/or hands and legs. For example, a leg kinematic chain may include a foot, a lower leg, and an upper leg.

An artificial neural network of the prediction model (116) can be trained using a supervised machine learning technique to predict the orientation of a part in a kinematic chain based on the orientations of other parts in the kinematic chain such that the part having the predicted orientation does not have to wear a separate sensor device to track its orientation.

Further, an artificial neural network of the prediction model (116) can be trained using a supervised machine learning technique to predict the orientations of parts in a kinematic chain that can be measured using one tracking technique based on the orientations of parts in the kinematic chain that are measured using another tracking technique.

For example, the tracking system as illustrated in FIG. 2 measures the orientations of the modules (111, 113, . . . , 119) using IMUs (e.g., 111, 113, . . . ). The inertial-based sensors offer good user experiences, have less restrictions on the use of the sensors, and can be implemented in a computational efficient way. However, the inertial-based sensors may be less accurate than certain tracking methods in some situations, and can have drift errors and/or accumulated errors through time integration.

For example, an optical tracking system can use one or more cameras to track the positions and/or orientations of optical markers that are in the fields of view of the cameras. When the optical markers are within the fields of view of the cameras, the images captured by the cameras can be used to compute the positions and/or orientations of optical markers and thus the orientations of parts that are marked using the optical markers. However, the optical tracking system may not be as user friendly as the inertial-based tracking system and can be more expensive to deploy. Further, when an optical marker is out of the fields of view of cameras, the positions and/or orientations of optical marker cannot be determined by the optical tracking system.

An artificial neural network of the prediction model (116) can be trained to predict the measurements produced by the optical tracking system based on the measurements produced by the inertial-based tracking system. Thus, the drift errors and/or accumulated errors in inertial-based measurements can be reduced and/or suppressed, which reduces the need for re-calibration of the inertial-based tracking system.

Figure 4:
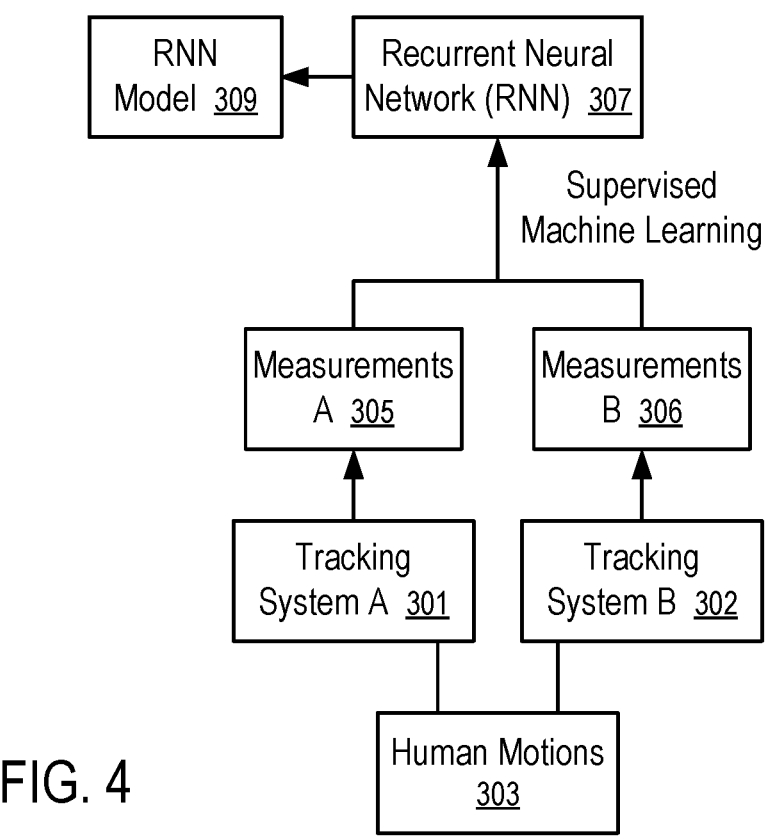
FIGS. 4 and 5 show methods to train a recurrent neural network (RNN) and use the RNN to predict movement measurements of one tracking system based on movement measurements of another tracking system according to one embodiment.

FIG. 4 shows a method to train a recurrent neural network (RNN) (307). For example, the method of FIG. 4 can be used to generate the prediction model (116) of FIG. 1 and/or FIG. 2.

In FIG. 4, human motions (303) are tracked/measured using two tracking systems (301 and 302). For example, the inertial-based system of FIG. 2 can be used as the tracking system A (301); and an optical tracking system can be used as the tracking system B (302).

For example, a person can wear the sensor devices (111, 113, 115, 117 and 119) that contains the IMUs (e.g., 121, 131, . . . ) for the inertial-based system. To train the recurrent neural network (RNN) (307), optical markers can be attached to the person for the optical tracking system (e.g., 302).

Optionally, the optical markers can be integrated on the sensor devices (111, 113, 115, 117 and 119) to track the motions (303) for the training of the prediction model (116) that includes the recurrent neural network (RNN) (307).

Optionally, additional optical markers are attached to certain parts of the user that do not wear the sensor devices that contain IMUs. For example, the forearms (112 and 114) and the torso (101) of the user, as illustrated in FIG. 1 do not have attached IMUs for the measurements of their orientations via the inertial-based system (e.g., 301); however, the forearms (112 and 114) and the torso (101) of the user can have optical markers to measure their orientations using the optical tracking system (e.g., 302).

In general, the optical tracking system (e.g., 302) can be replaced with another tracking system that makes the orientation measurements based on infrared signals, ultrasound signals, radio frequency identification tag (RFID) signal, etc. Further, a combination of tracking systems can be used as the tracking system B (302) to obtain the most accurate measurements B (306) of the human motions (303). The tracking system B (302) is used to measure the orientations of at least some of the parts of the person not measured by the tracking system A (301) and optionally the parts of the person that are measured by the tracking system A (301).

After the person wears the sensor modules and optical markers for the tracking system A (301) and the tracking system B (302), the person may perform a plurality of sequences of actions that involve various motion patterns of the kinematic chains.

The sequences can start from a common calibration pose, such as a pose as illustrated in FIG. 1. Other examples of calibration poses can be found in U.S. patent application Ser.

No. 15/847,669, filed Dec. 19, 2017 and entitled "Calibration of Inertial Measurement Units Attached to Arms of a User and to a Head Mounted Device," U.S. patent application Ser. No. 15/817,646, filed Nov. 20, 2017 and entitled "Calibration of Inertial Measurement Units Attached to Arms of a User to Generate Inputs for Computer Systems," the entire disclosures of which applications are hereby incorporated herein by reference.

The positions and/or orientations of the parts of the person, such as the head (107), the arms (103, 105, 112, 114) and hands (106 and 108), and torso (101), can be measured/tracked using the tracking systems A and B (301 and 302) concurrently to generate measurements A and B (305 and 306) respectively.

The recurrent neural network (RNN) (307) can be trained, using a supervised machine learning technique, to predict the measurements B (306) generated by the tracking system B (302) (e.g., an optical tracking system, another tracking system, or a combination of tracking systems) based on the measurement A (305) generated by the tracking system A (301) (e.g., an inertial-based system as illustrated in FIG. 2). The supervised machine learning technique adjusts the parameters in the recurrent neural network (RNN) (307) to minimize the difference between the actual measurements B (306) and the predictions made using the measurements A (305) as input to the recurrent neural network (RNN) (307). The recurrent neural network (RNN) (307) having the adjusted parameters provide a RNN model (309) that can be used as the prediction model (116) in FIG. 1 and/or FIG. 2.

The recurrent neural network (RNN) (307) may include a network of Long Short-Term Memory (LSTM) units to selectively remember histories of states based on which predictions are made.

The sequences of actions performed by the person performing the human motions (303) can be sampled at a predetermined time interval to obtain the measurements (305 and 306) for the training of the recurrent neural network (RNN) (307).

In some instances, some sequences of actions are repeated multiple times and/or at different speeds; and scaling of the time measurement and/or double exponential smoothing can be applied to input parameters to align the datasets of the sequences and/or to normalize the time scale.

After the RNN model (309) is trained to have the capability to predict the measurements B (306) generated using the tracking system B (302), it is no longer necessary to use the tracking system B (302). For example, the RNN model (309) can be developed in a manufacturing facility and/or a developer's facility. Users of sensor modules (e.g., 111, 113, . . . , 119) do not need to wear optical markers or other devices that are used in the tracking system B (302), as illustrated in FIG. 5.

Figure 5:
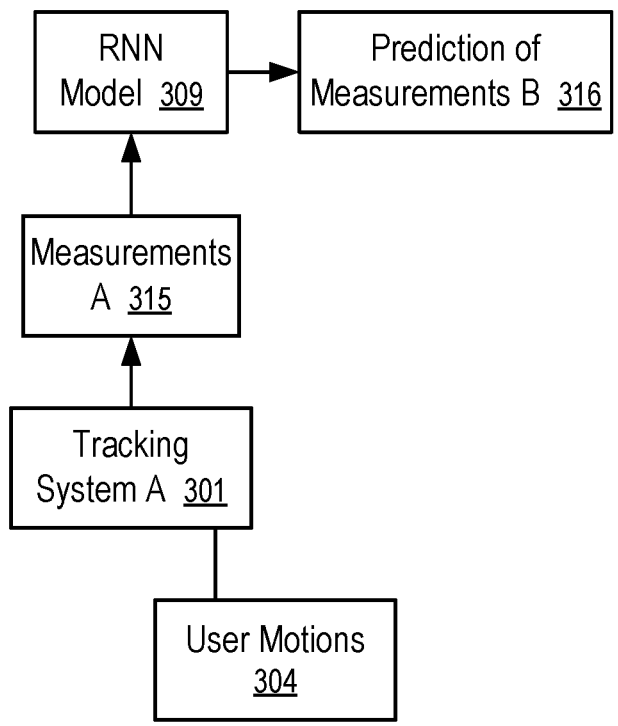

FIG. 5 shows a method to use the RNN to predict movement measurements of one tracking system based on movement measurements of another tracking system according to one embodiment.

In FIG. 5, a tracking system A (301) (e.g., the inertial-based system illustrated in FIG. 2) is used to track user motions (304) of a user without tracking system B (302) (e.g., an optical tracking system). The measurements A (315) of the user motions (304) measured using the tracking system A (301) (e.g., the inertial-based system illustrated in FIG. 2) are used in the RNN model (309) to generate the predictions (316) of measurements B that would be generated by the tracking system B (302). The predictions (316) of measurements B can be provided to the motion processor (145) to control the skeleton model (143) (e.g., as illustrated in FIG. 3), as if the tracking system B (302) were used to obtain the measurements.

For example, an RNN model (309) having LSTM units can be trained to predict the orientation measurements generated by an optical tracking system for a kinematic chain using orientation measurements of part of the kinematic chain generated by the sensor modules having the IMUs.

For example, sensors modules (113 and 119) are attached to the upper arm (103) and the hand (119) in a forearm kinematic chain using measurements generated from the IMUs (e.g., 131) in the sensor modules (113 and 119). The RNN model (309) predicts, from the IMU measurements for a sequence of the user motions (304), the orientation measurements that would be generated by an optical tracking system not only for the forearm (112) in the forearm kinematic chain but also for the upper arm (103) and the hand (108). The predicted orientation measurements are used in the motion processor (145) to configure the corresponding forearm kinematic chain of the skeleton (143), including the forearm (233), the upper arm (203) and the hand (208).

In some instances, it is not necessary to use a tracking system implemented using one technique (e.g., optical tracking system) to calibrate the measurements of a tracking system implemented using another technique (e.g., inertial-based tracking system). The prediction model (116) can be trained to predict the orientations of parts that have missing sensor modules without using multiple training technologies, as illustrated in FIG. 6.

Figure 6:
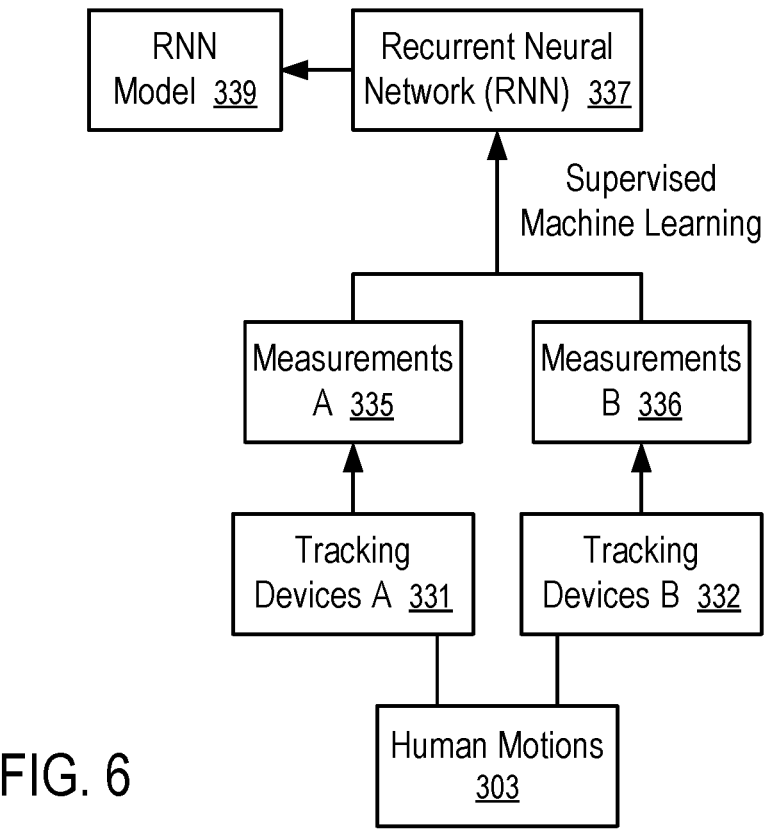

FIG. 6 shows a method to train a recurrent neural network (RNN) (337) to predict the measurements of missing sensor modules.

In FIG. 6, human motions (303) of a person wearing both tracking devices A (331) and tracking devices B (332) are measured. For example, the tracking devices A (331) correspond to the head module (111), arm modules (113 and 115) and hand modules (117 and 119) as illustrated in FIG. 1 and/or FIG. 2. In FIG. 1, sensor modules are missing from the forearms (112 and 114) and the torso (101).

To train a recurrent neural network (RNN) (337) to predict the measurements of the missing sensor modules, the method of FIG. 6 uses the tracking devices B (332) that are additional IMU modules attached the forearms (112 and 114) and the torso (101). The additional IMU modules can be similar to the arm module (113) and attached to the forearms (112 and 114) and the torso (101) via armband, strap and/or other ways to attach the module to the respective locations on the person that performs the human motion.

A supervised machine learning technique can be applied to the recurrent neural network (RNN) (337) using the measurements A (335) generated by the tracking devices A (331) to predict the measurements B (336) generated by the tracking devices B (333). The supervised machine learning adjusts the parameters of the recurrent neural network (RNN) (337) to minimize the differences between the measurements B (336) and their predictions made by applying the measurements A (335) as input to the recurrent neural network (RNN) (337). The recurrent neural network (RNN) (337) and its trained parameters provide the RNN model (339) that can be used to make the prediction of the measurements of the tracking devices B (332). Thus, when the RNN model (339) is used, the tracking devices B (332) can be omitted, as illustrated in FIG. 7.

FIG. 7 shows a method to use the RNN trained using the method of FIG. 6 to predict movement measurements of missing sensor modules based on movement measurements of attached sensor modules according to one embodiment.

In FIG. 7, tracking devices A (331) (e.g., 111, 113, 115, 117 and 119 in FIG. 1 and/or FIG. 2) are used to track user motions (304) of a user without tracking devices B (332). The measurements A (345) of the user motions (304) measured using the tracking devices A (331) (e.g., 111, 113, 115, 117 and 119) are used as input to the RNN model (339) to generate the predictions (346) of measurements B that would be generated by the tracking devices B (332) if the tracking devices B (332) were used. The measurements A (345) and the predictions (346) of measurements B can be provided to the motion processor (145) to control the skeleton model (143) (e.g., as illustrated in FIG. 3), as if both the tracking devices A (331) and the tracking devices B (332) were used.

For example, an RNN model (339) having LSTM units can be trained to predict the orientation measurements generated by sensor modules having IMUs for one or more parts of a kinematic chain using orientation measurements of the remaining parts of the kinematic chain generated by the sensor modules having the IMUs such that the sensor modules having IMUs can be omitted for the one or more parts of a kinematic chain.

For example, sensors modules (113 and 119) are attached to the upper arm (103) and the hand (119) in a forearm kinematic chain using measurements generated from the IMUs (e.g., 131) in the sensor modules (113 and 119). The RNN model (339) predicts, from the IMU measurements for a sequence of the user motions (304), the orientation measurements that would be generated by a sensor module having an IMU (e.g., similar to the arm module (113)) if such a sensor module were attached to the forearm (112) in the forearm kinematic chain. The predicted orientation measurements (346) for the forearm (112) and the measurements for the upper arm (103) and the hand (119) are used together in the motion processor (145) to configure the corresponding forearm kinematic chain of the skeleton (143), including the forearm (233), the upper arm (203) and the hand (208).

Since the prediction (346) can be obtained from the use of the sensor modules (113 and 119) without actually using a sensor module to track the orientation of the forearm (112), the user performing the user motions (304) does not have to wear the additional sensor module on the forearm (112). Thus, the user experience is improved; and the cost of the tracking system for the user is reduced.

FIG. 8 shows a method to train an artificial neural network to predict orientation measurements.

The method of FIG. 8 includes attaching (401) tracking devices to at least one kinematic chain of a person, including first tracking devices that are separated by second tracking devices on one or more kinematic chains.

For example, the first tracking devices are an arm module (115) on an upper arm (105) and a hand module (117) on a hand (106); and the one or more second tracking devices include a tracking device on a forearm (114) on a forearm kinematic chain that includes the upper arm (105), the forearm (114), and the hand (106) connected via the elbow joint and the wrist joint. The tracking device on the forearm (114) separates the arm module (115) and the hand module (117) on the forearm kinematic chain. The arm module (115) and the hand module (117) include IMUs to track their orientations in an inertial-based tracking system and can have optical markers to separately measure their orientations using an optical tracking system. The tracking device on the forearm (114) can be an optical marker used to measure its orientation in the optical tracking system and can optionally include an IMU to track its orientation in the inertial-based tracking system. When the tracking device on the forearm (114) enables tracking in both the inertial-based tracking system and the optical tracking system, the tracking device on the forearm (114) can be implemented in a same way as the arm module (115).

The method of FIG. 8 further includes performing (403) a plurality of sequences of actions (303) involving the least one kinematic chain. The sequences of actions (303) start from a common calibration pose (e.g., as illustrated in FIG. 1 or another pose). The actions can be designed to simulate typical actions in an application (147), such as a virtual reality game, an augmented reality application, etc.

The method of FIG. 8 further includes: recording (405) orientations of the first and second tracking devices in the sequences, where orientations of the first tracking devices are tracked using both a first system (301) (e.g., an inertial-based tracking system) and a second system (302) (e.g., an optical tracking system) and orientations of the one or more second tracking devices are tracked using the second system (302). Optionally, the orientations of the one or more second tracking devices can also be tracked using the first system (301) (e.g., the inertial-based tracking system) and used in situations where the second system (302) is incapable of measuring the orientation of the one or more second tracking devices. For example, when in a certain position, the optical marker on the forearm (114) is out of the field of view of a tracking camera of the optical tracking system, the orientation determined from the IMU attached to the forearm (114) can be used to generate an orientation measurement of the forearm (114). For example, when the optical marker is visible before and/or after the obscured position in an action sequence, the orientation measurements of the forearm (114) obtained from the IMU measurements of the forearm (114) can be calibrated via the measurements from the optical tracking system to calculate an orientation of the forearm at the obscured position with an improved accuracy that is substantially the same as the measurement from the optical tracking system.

The method of FIG. 8 further includes: training (407) an artificial neural network (e.g., 307) to predict the orientations of the first and second tracking devices measured by the second system (302) (e.g., an optical tracking system) based on the orientations of the first tracking devices measured by the first system (301) (e.g., an inertial-based tracking system).

In some instances, different kinematic chains are separated trained using separate artificial neural networks. The trained networks can be used separately for the individual kinematic chains for improved computational efficiency. Alternatively, an artificial neural network can be trained for the kinematic model of the entire skeleton (143) for universal applications.

The trained artificial neural network can be re-trained using a reinforcement learning technique to improve its prediction accuracy in some motion scenarios.

Figure 9:
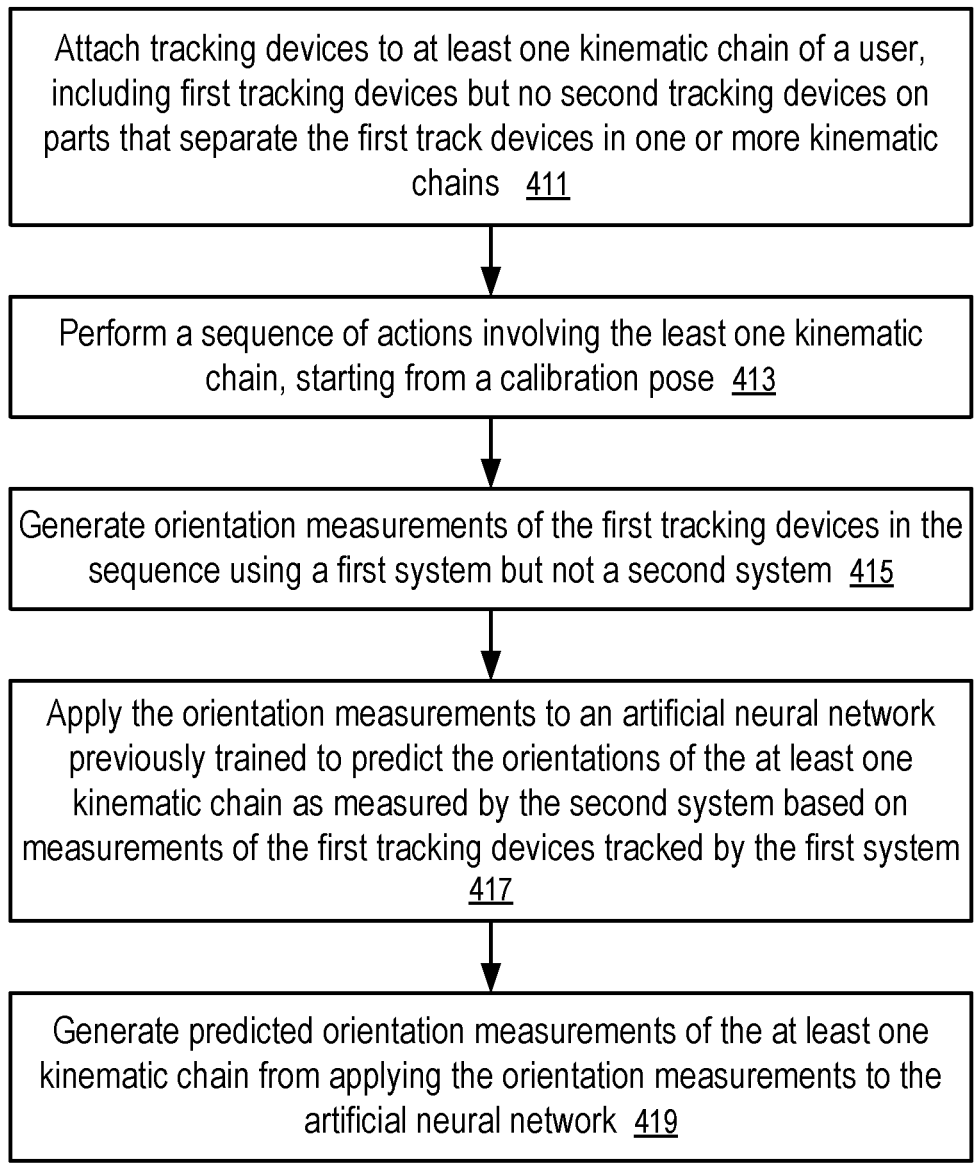

FIG. 9 shows a method to track user movements using the artificial neural network trained using the method of FIG. 8.

The method of FIG. 9 includes: attaching (411) tracking devices to at least one kinematic chain of a user, including first tracking devices but no second tracking devices on parts that separate the first track devices in one or more kinematic chains; performing (413) a sequence of actions (304) involving the least one kinematic chain, starting from a calibration pose; generating (415) orientation measurements of the first tracking devices in the sequence using a first system (301) but not a second system (302); applying (417) the orientation measurements to an artificial neural network, previously trained (e.g., using the method of FIG. 9) to predict the orientations of the at least one kinematic chain as measured by the second system (302) based on measurements of the first tracking devices tracked by the first system (301); and generating (419) predicted orientation measurements of the at least one kinematic chain from applying the orientation measurements to the artificial neural network.

For example, a computing system includes: a plurality of sensor modules (e.g., 111, 113, 115, 117, and/or 119) and a computing device (141). Each of the sensor modules has an inertial measurement unit (e.g., 121 or 113) and is attached to a portion (e.g., 107, 113, 115, 106, or 108) of the user to generate motion data identifying a sequence of orientations of the respective portion of the user. The inertial measurement unit includes a micro-electromechanical system (MEMS) gyroscope and may further include a magnetometer and a MEMS accelerometer. The computing device provides the sequences of orientations measured by the sensor modules as input to an artificial neural network (e.g., 116), obtains at least an orientation measurement of a part of the user as output from the artificial neural network (e.g., 116), uses the orientation measurement obtained from the artificial neural network to configure or set the orientation of a rigid part in a kinematic chain of a skeleton model (143) representative of the user, and controls an application (147) according to the state of the skeleton model (143).

For example, the artificial neural network can be a recurrent neural network previously trained to make predictions matching with orientation measurements generated using an optical tracking system. The recurrent neural network contains Long Short-Term Memory (LSTM) units to remember a set of state histories derived from the input sequences of orientations to predict the current orientations of the kinematic chain.

Since the artificial neural network can predict the orientation measurements generated using an optical tracking technique, the part of the user (and other parts of the user) is not tracked using optical tracking.

For example, the orientations of the part of the user is tracked using one of the plurality of sensor modules; and the artificial neural network is used to improve the IMU-based measurements to remove drift error and/or accumulated error.

For example, the orientations of the part of the user is not even tracked using a sensor module containing an inertial measurement unit, since its orientation can be predicted using applying orientation measurements of other parts of the user in the kinematic chain as input to the artificial neural network.

For example, the plurality of sensor modules (e.g., 111, 113, 115, 117, and/or 119) tracks portions (e.g., 107, 103, 105, 106, and/or 108) of the user correspond to a subset of rigid parts (e.g., 207, 203, 205, 206 and/or 208) in the kinematic chain of the skeleton model (143); and the rigid part (e.g., 215, 223, or 232) corresponding to the part (e.g., 114, 114, or 101) of the user that is not tracked separates, in the kinematic chain, the subset of rigid parts (e.g., 207, 203, 205, 206 and/or 208).

For example, the artificial neural network is trained to predict orientation measurements generated using a separate tracking system; and the artificial neural network provides, as output, predicted orientation measurements to be generated by the separate tracking system for the portions (e.g., 107, 103, 105, 106, and/or 108) of the user to which the plurality of sensor modules (e.g., 111, 113, 115, 117, and/or 119) are attached.

For example, to train the artificial neural network, a set of sensor modules are attached to a person who performs a plurality of sequence of motions to generate first orientation measurements and second orientation measurements from the set of sensor modules. A supervised machine learning technique is used to train the artificial neural network to predict the second orientation measurements based on the first orientation measurements.

For example, the first orientation measurements are measured using a first technique; the second orientation measurements are measured using a second technique; and the artificial neural network is trained to predict the measurements made using the second technique (e.g., optical tracking) based on the measurements generated using the first technique (e.g., IMU-based tracking).

For example, when the artificial neural network is found to have inaccurate predictions in some scenarios, the artificial neural network can be further trained using a reinforcement learning technique, based on further measurements made in connection with such scenarios.

In some instances, the second orientation measurements identify orientations of the plurality of sensor modules; and the first orientation measurements identify orientations of a subset of the plurality of sensor modules such that measurements of the subset of sensor modules made using one tracking technique (e.g., IMU-based tracking) can be used with the artificial neural network to predict the orientation measurements of the entire set of sensor modules made using another tracking technique (e.g., optical tracking).

In other instances, the first orientation measurements identify orientations of a first subset of the plurality of sensor modules; and the second orientation measurements identify orientations of a second subset of the plurality of sensor modules, such that the measurement from one subset of the sensor devices can be used to predict the measurements made by another subset of the sensor devices.

The present disclosure includes methods and apparatuses which perform these methods, including data processing systems which perform these methods, and computer readable media containing instructions which when executed on data processing systems cause the systems to perform these methods.

For example, the computing device (141), the arm modules (113, 115) and/or the head module (111) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
  a plurality of sensor modules, each respective sensor module in the plurality of sensor modules having an inertial measurement unit and attached to a portion of a user to generate motion data identifying a sequence of orientations of a kinematic chain of the user including a plurality of rigid bodies wherein at least one untracked rigid body in the plurality of rigid bodies does not have a respective sensor module attached thereto and at least one other rigid body in the plurality of rigid bodies includes a sensor module in the plurality of sensor modules; and
  a computing device coupled to the plurality of sensor modules and configured to:
    provide the sequence of orientations measured by each respective sensor module as input to an artificial neural network (ANN), wherein the ANN is associated with and trained for the kinematic chain, wherein the ANN is trained to minimize a difference between measurements of the plurality of sensor modules and predictions made using measurements of optical tracking sensors not situated on the user, and wherein the training of the ANN for the kinematic chain comprises:
  obtaining a first set of data from at least one of the plurality of sensor modules;
  obtaining a second set of data from a plurality of optical tracking sensors tracking one or more optical markers, wherein the one or more optical markers are integrated on the plurality of sensor modules; and
  training the ANN with the first set of data and the second set of data;
obtain, as output from the artificial neural network, an orientation measurement of the kinematic chain, the orientation measurement comprising a plurality of values representing the orientation of the optical tracking sensors, and wherein the values include a value corresponding to the untracked rigid body and a plurality of values corresponding to the other rigid bodies of the kinematic chain equipped with the sensor modules; and
control an application by configuring, according to the orientation measurement obtained from the artificial neural network, an orientation of a rigid part in the kinematic chain of a skeleton model that has a plurality of rigid parts connected by joints.

2. The system of claim 1, wherein the ANN is trained using orientation measurements generated using an optical tracking system.

3. The system of claim 2, wherein orientations of the part of the user are not tracked using optical tracking.

4. The system of claim 3, wherein orientations of the part of the user are tracked using one of the sensor modules.

5. The system of claim 3, wherein orientations of the part of the user are not tracked using a sensor module containing the inertial measurement unit.

6. The system of claim 3, wherein the plurality of sensor modules tracks portions of the user corresponding to a subset of rigid parts in the kinematic chain; and the rigid parts in the subset of rigid parts are separated in the kinematic chain by the rigid part corresponding to the part of the user that is not tracked using a sensor module.

7. The system of claim 2, wherein the ANN is a recurrent neural network.

8. The system of claim 7, wherein the recurrent neural network contains Long Short-Term Memory (LSTM) units.

9. The system of claim 1, wherein the inertial measurement unit includes a micro-electromechanical system (MEMS) gyroscope.

10. The system of claim 9, wherein the inertial measurement unit further includes a magnetometer and a MEMS accelerometer.

11. The system of claim 1, wherein the ANN is trained to predict orientation measurements generated using an optical tracking system; and
  the ANN provides, as output, predicted orientation measurements to be generated by the optical tracking system for portions of the user to which the plurality of sensor modules is attached.

12. The system of claim 1, wherein the one or more optical markers are attached to at least one part of the kinematic chain where the plurality of sensor modules s not attached thereto.

13. A method, comprising:
receiving, from a plurality of inertial measurement units attached to portions of a user connected by joints, motion data identifying sequences of orientations of the portions of the user, the portion of the user comprising a kinematic chain including a plurality of rigid bodies wherein at least one untracked rigid body in the plurality of rigid bodies does not have a respective inertial measurement unit attached thereto and at least one other rigid body in the plurality of rigid bodies includes an inertial measurement unit in the plurality of inertial measurement units;
providing the sequences of orientations of the portions of the user, as measured by the inertial measurement units, as input to an artificial neural network (ANN), wherein the ANN is associated with and trained for the kinematic chain and wherein the ANN is trained to minimize a difference between measurements of the plurality of inertial measurement units and predictions made using measurement of optical tracking sensors not situated on the user, and wherein the training of the ANN for the kinematic chain comprises:
  obtaining a first set of data from at least one of the plurality of inertial measurement units,
  obtaining a second set of data from a plurality of optical tracking sensors tracking one or more optical markers, wherein the one or more optical markers are integrated on the plurality of inertial measurement units, and
  training the ANN with the first set of data and the second set of data;
obtaining, as output from the ANN, an orientation measurement of the kinematic chain, the orientation measurement comprising a plurality of values representing the orientation of the optical tracking sensors, and wherein the values include a value corresponding to the untracked rigid body and a plurality of values corresponding to the other rigid bodies of the kinematic chain equipped with the plurality of inertial measurement units;
configuring, according to the orientation measurement obtained from the ANN, an orientation of a rigid part in the kinematic chain of a skeleton model that has a plurality of rigid parts connected by joints; and
controlling an application based on a state of the kinematic chain.

14. The method of claim 13, wherein the ANN is a recurrent neural network having Long Short-Term Memory (LSTM) units.

15. The method of claim 14, wherein part of the user has no attached inertial measurement unit to measure orientations of the part; and the ANN further outputs predicted orientation measurements of the portions of the user tracked using the inertial measurement units.

16. The method of claim 15, wherein the predicted orientation measurements generated by the ANN correct accumulated errors in the sequences of orientations measured by the inertial measurement units.

17. A method, comprising:
attaching a plurality of sensor modules to a kinematic chain of a person, the plurality of sensor modules including first sensor modules having a first type and second sensor modules having a second type, the first type comprising an inertial-based tracking type and the second type comprising an optical tracking type;
measuring a plurality of sequences of orientations of the sensor modules during the person performing a plurality of sequence of motions to generate first orientation measurements generated by the first sensor modules and second orientation measurements generated by the second sensor modules; and training an artificial neural network (ANN) for the kinematic chain using a supervised machine learning technique applied to the first and second orientation measures, the resulting ANN taking an orientation measurement of a sensor of first type and outputting a plurality of predicted values of the second type, the plurality of predicted values corresponding to each of the plurality of sensor modules, wherein the ANN is trained to minimize a difference between measurements of the sensors of the first type and predictions made using measurements of sensors of the second type not situated on a user, and wherein the training of the ANN for the kinematic chain comprises:

obtaining a first set of data from at least one of the plurality of sensor modules;

obtaining a second set of data from a plurality of optical tracking sensors tracking one or more optical markers, wherein the one or more optical markers are integrated on the plurality of sensor modules; and training the ANN with the first set of data and the second set of data.

18. The method of claim 17, wherein the ANN is a recurrent neural network having Long Short-Term Memory (LSTM) units; and the method further comprises:

generating further measurements using the plurality of sensor modules to the person; and training the ANN, previously trained using the supervised machine learning technique based on the first orientation measurements and the second orientation measurements, using the further measurements and a reinforcement learning technique.

19. The method of claim 17, the first sensor modules comprising inertial measurement sensors.

20. The method of claim 17, the second sensor modules comprising optical tracking sensors.

* * * * *